Jan. 19, 1937.   H. R. PALMER   2,068,567
AIR AND GAS MIXER FOR GAS BURNERS
Filed Jan. 11, 1935
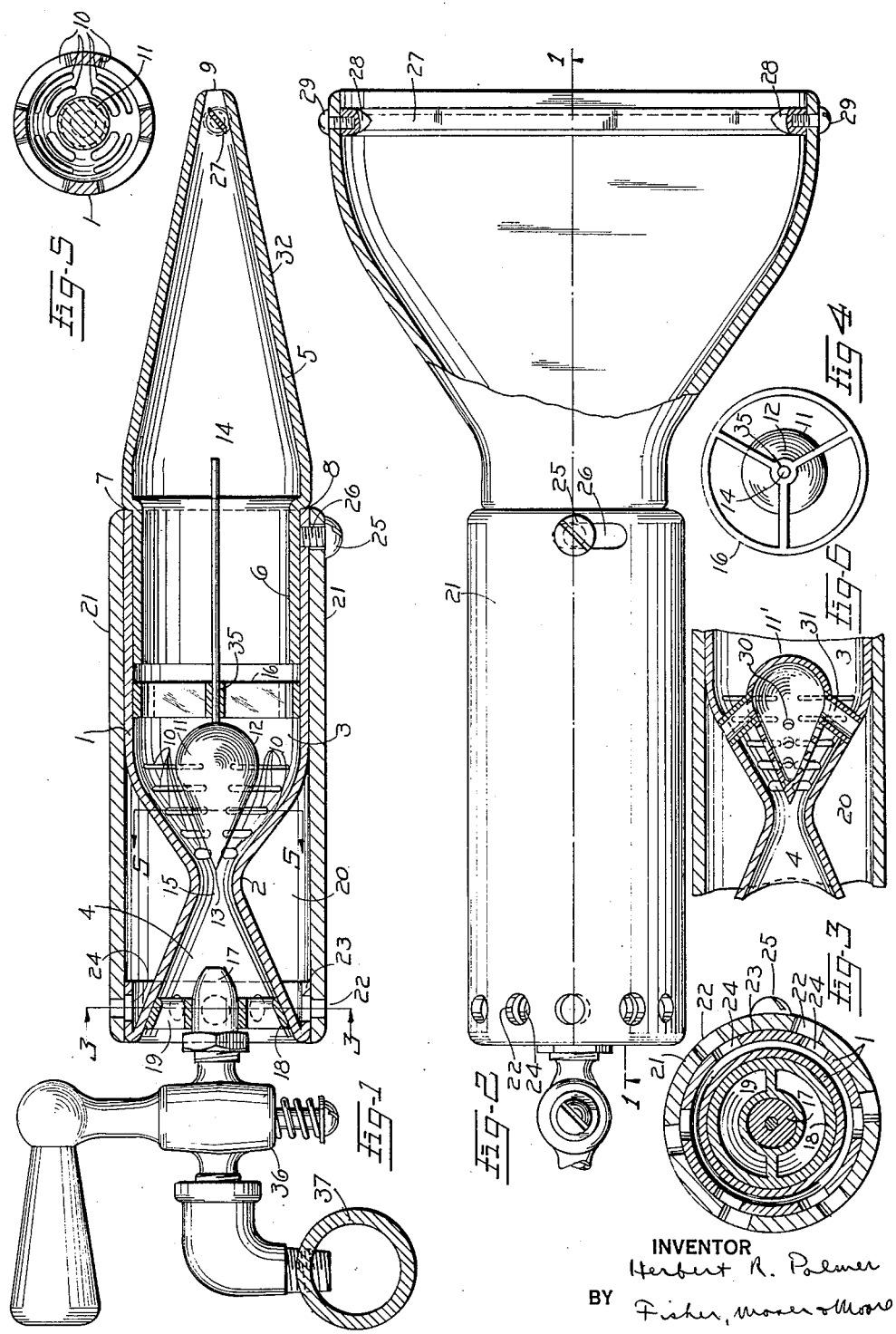
INVENTOR
Herbert R. Palmer
BY Fisher, Moser & Moore
ATTORNEYS Patented Jan. 19, 1937

2,068,567

UNITED STATES PATENT OFFICE 2,068,567

AIR AND GAS MIXER FOR GAS BURNERS

Herbert R. Palmer, Cleveland, Ohio

Application January 11, 1935, Serial No. 1,416

4 Claims. (Cl. 158—118)

My invention relates to air and gas mixers for gas burners and while it is adapted for use with any kind of gas burners, for illustrative purposes, it is shown as applied to a furnace burner.

The general object of the invention is to so construct the mixing tube that the air and gas will flow therethrough at a maximum of velocity and with the least possible obstruction to the flow of the mixture.

A further object is to provide for the complete mixing of the air and gas before the mixture reaches the burner thus insuring a high degree of combustion efficiency.

Other objects and advantages of the invention will be apparent as the description is considered in connection with the accompanying drawing, in which:

Figure 1 is a longitudinal sectional view through the mixing tube and burner, taken on the line 1—1 of Figure 2;

Figure 2 is a plan view showing the burner partly broken away;

Figure 3 is a section on the line 3—3 of Figure 1;

Figure 4 is an end view of the spider for supporting the deflector member;

Figure 5 is a section on the line 5—5 of Figure 1; and

Figure 6 is a longitudinal sectional view through the secondary mixing chamber, showing a modified form of deflector.

Referring more particularly to the drawing 1 denotes a mixing tube, the walls of the lower half of which converge at a point adjacent its inner or inlet end, as at 2, forming oppositely flaring communicating inner and outer primary and secondary mixing chambers 4 and 3 respectively. A furnace or other suitable burner 5 has its inner cylindrical end 6, tightly but removably sleeved within the upper cylindrical half of the mixing tube 1 and is prevented from being inserted too far therein by a stop shoulder 7, which engages the outer or upper extremity 8 of the tube when the burner is properly positioned. The outer end or head 32 of the burner is flattened or contracted into fan shape to provide an elongated flame orifice 9.

The walls of the secondary mixing chamber 3 is provided with a plurality of parallel horizontally disposed air inlet slots 10 of graduated capacity, that is, outer slots will be progressively longer and narrower than the innermost slots, so that the volume of air admitted therethrough will be uniform throughout the length of the slotted area of the chamber 3. A substantially conical or wedge shaped deflector member 11 is axially suspended within the secondary mixing chamber 3, with its rounded top 12 adjacent the outer end of this chamber, and its apex 13 opposite and axially spaced from the walls of the contracted portion 2. This member 11 is fixed to a rod 14 in turn adjustably held in the central aperture 35 of a spider or ring 16, in turn tightly but removably held just above the top of the chamber 3, by frictional contact. By adjusting the deflector member 12 in or out, the velocity and volume of gas flowing through the restricted passage 15 may be regulated and the intensity of the flame at orifice 9 nicely controlled.

Gas is supplied to the mixing tube 1, from a gas cock 36, which receives gas from a manifold 37 connected with a source of supply, not shown. The gas cock discharges gas in a convenient manner into the primary mixing chamber 4, through a nipple 17, threadly connected to a spider 18 suitably fixed within the inner end of the tube 1.

Primary air is admitted to the chamber 4 through openings 19 in the spider 18, and a secondary supply of air for the chamber 3 flows into the annular air chamber 20, surrounding the two air and gas mixing chambers and positioned between the walls of the latter and a sleeve 21, through air inlet openings 22 formed in the inner end of the sleeve. This sleeve 21 fits tightly over the mixing tube 1, with freedom for slight rotary movement thereon, and extends from end to end of the tube. The inner end of the latter is formed with an outwardly and forwardly bent flange 23 having air inlet openings 24 normally slightly overlapping or staggered with respect to the openings 22, as shown in Figure 3. However, when the sleeve is rotated to the position illustrated in Figure 2, the openings 22 and 24 will register with each other and permit of the maximum amount of air flowing therethrough. A headed screw 25, extending through the slot 26 and into the outer end of tube 1, limits the movement of the sleeve 21.

As the gas passes through primary mixing chamber 4 it is mixed with all the air entering through openings 19, that it can take. This rich mixture of air and gas is then injected through the restricted passage 15 and against the point 13 of deflecting member 11, by which it is deflected outwardly in the form of a hollow cone. The high speed of the mixture passing close to the graduated air openings 10, due to the suction or venturi like action of the double cone shaped mixing tube, sucks in additional air through these openings, and this additional air passes into and is intimately mixed with the relatively thin hollow conical body of rich mixture. The conical deflector member 11, opens up the rich mixture and forces it outwardly towards the air inlet openings 10, with a minimum of obstruction to the rapidly flowing stream. But for the presence of the member 11, the air entering through openings 10 would become stratified, that is, would not completely permeate the body of the air and gas stream. After the leaner mixture passes the outermost openings 10, it flows around the rounded outer end 12 of the deflector 11, with the least possible turbulence.

It has been found in actual practice, that due to the high velocity of the gas, and air stream, the latter has a tendency to blow or roar at the outlet or flame orifice. To overcome this a baffle member consisting of a thin narrow strip 27, of suitable metal, is pivotally mounted in the burner adjacent the orifice 9. It is necessary that the baffle member 27 be thin and that its flat parallel faces be arranged at an angle of approximately 30 degrees to the horizontal and to the general direction of flow of mixture through the burner head 32 and orifice 9. The ends 28 of baffle strip 27 are somewhat enlarged so as to permit of the strip being conveniently mounted for pivotal adjustment, by means of screws 29, thus permitting of slight adjustments in angularity from time to time.

In Figure 6 I have illustrated a modified form of deflector member 11', in all respects identical with the deflector 11, with the exception that in the Figure 6 construction, the deflector member is hollow, and formed with perforations 30. Air is supplied to the interior of the hollow deflector member, from the primary air chamber 20, through a plurality of pipes 31. According to this modified form of the invention, air will be directed against the inner face of the hollow cone of rich air and gas mixture passing through the upper venturi or chamber portion 3, thus insuring a still more intimate mixture.

Having thus described my invention,
What I claim as my invention is:

1. An air and gas mixer, comprising a mixing tube, said mixing tube comprising communicating primary and secondary mixing chambers, the walls of said mixing chambers converging toward a common point, means for supplying gas and air to said primary mixing chamber, a conical deflector in said secondary mixing chamber, air openings through the wall of said secondary mixing chamber, a sleeve enclosing said primary and secondary mixing chambers and forming an air chamber, and means for admitting air to said air chamber.

2. An air and gas mixer, comprising a mixing tube, said mixing tube comprising communicating primary and secondary mixing chambers, the walls of said mixing chambers converging toward a common point, means for supplying gas and air to said primary mixing chamber, a hollow perforated conical deflector in said secondary mixing chamber, a sleeve enclosing said primary and secondary mixing chambers and forming an air chamber, means for admitting air to said air chamber, and means for placing said deflector in communication with said air chamber.

3. An air and gas mixer, comprising a mixing tube, said mixing tube comprising communicating primary and secondary mixing chambers, the walls of said chambers converging toward a common point, means for supplying gas and air to said primary mixing chamber, graduated air openings in the wall of said secondary mixing chamber for admitting air to said secondary mixing chamber, a substantially conical deflector in said secondary mixing chamber having a rounded outer end, a sleeve enclosing the mixing tube and forming an air chamber with the walls of said primary and secondary chambers, said sleeve extending outwardly beyond the outer end of the walls of the secondary chamber, and means for admitting a supply of air to said air chamber.

4. An air and gas mixer, according to claim 3, wherein the sleeve is rotatable and the means for admitting air to the air chamber comprises communicating openings in the wall of said sleeve and a flange on said primary mixing chamber.

HERBERT R. PALMER.